United States Patent
Chirca et al.

(10) Patent No.: US 11,372,646 B2
(45) Date of Patent: Jun. 28, 2022

(54) EXIT HISTORY BASED BRANCH PREDICTION

(71) Applicant: TEXAS INSTRUMENTS INCORPORATED, Dallas, TX (US)

(72) Inventors: Kai Chirca, Dallas, TX (US); Timothy D. Anderson, University Park, TX (US); David E. Smith, Jr., Allen, TX (US); Paul D. Gauvreau, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/684,410

(22) Filed: Nov. 14, 2019

(65) Prior Publication Data
US 2020/0210191 A1  Jul. 2, 2020

Related U.S. Application Data

(60) Provisional application No. 62/786,861, filed on Dec. 31, 2018.

(51) Int. Cl.
*G06F 9/38* (2018.01)
*G06F 9/30* (2018.01)

(52) U.S. Cl.
CPC ........ *G06F 9/3806* (2013.01); *G06F 9/30101* (2013.01); *G06F 9/3844* (2013.01); *G06F 9/3853* (2013.01)

(58) Field of Classification Search
CPC .... G06F 9/3844; G06F 9/3848; G06F 9/3806; G06F 9/3853
See application file for complete search history.

(56) References Cited

U.S. PATENT DOCUMENTS

2016/0132331 A1* 5/2016 Godard ................ G06F 9/3806
711/137

OTHER PUBLICATIONS

N. Ranganathan. Control flow speculation for distributed architectures; Dissertation for The University of Texas at Austin; May 2009; 288 total pages. (Year: 2009).*
Ranganathan, Nitya et al. Combining Hyperblocks and Exit Prediction to Increase Front-End Bandwith and Performance.: Dept. of Computer Sciences Technical Report TR-02-41, The University of Texas, Austin and Rutgers State University, 2002. pp 1-27.
"Dynamic Branch Prediction." CSE P548, Autumn 2006. 15 pages.

* cited by examiner

*Primary Examiner* — Keith E Vicary
(74) *Attorney, Agent, or Firm* — Brian D. Graham; Charles A. Brill; Frank D. Cimino

(57) ABSTRACT

A computer-implemented method includes fetching a fetch-packet containing a first hyper-block from a first address of a memory. The fetch-packet contains a bitwise distance from an entry point of the first hyper-block to a predicted exit point. The method further includes executing a first branch instruction of the first hyper-block. The first branch instruction corresponds to a first exit point. The first branch instruction includes an address corresponding to an entry point of a second hyper-block. The method also includes storing, responsive to executing the first branch instruction, a bitwise distance from the entry point of the first hyper-block to the first exit point. The method further includes moving a program counter from the first exit point of the first hyper-block to the entry point of the second hyper-block.

20 Claims, 7 Drawing Sheets

EXIT HISTORY BASED BRANCH PREDICTION

CROSS-REFERENCE TO RELATED APPLICATIONS

This application claims priority to U.S. Provisional Application No. 62/786,861, filed Dec. 31, 2018, which is hereby incorporated by reference.

TECHNICAL FIELD

The present disclosure relates generally to branch prediction in digital signal processors, and particularly to exit history based strategies for branch prediction circuits in digital signal processors.

BACKGROUND

Instruction pipelining is a method in which computer-executable instructions are broken into a series of sequential steps to create a 'pipeline.' Instructions in the steps can then be performed concurrently by different parts of a processor. Pipelining can be enhanced through a technique called branch prediction. Branch prediction is a method whereby a digital circuit attempts to predict which direction a branch will take before a conditional premise is known, for example, in an if-then-else logic structure, a branch predictor might predict that the outcome will probably be 'else.' Improving the accuracy of branch prediction results in higher performance in computing machines using instruction pipelining.

SUMMARY

An example of this disclosure is a system which includes a processor having an exit history register. The processor is coupled to a memory storing an exit history table and a plurality of hyper-blocks, with each hyper-block comprising one or more branch instructions. Each branch instruction has a beginning and an end, and each of the hyper-blocks has an entry point and a plurality of exit points. Each of the plurality of exit points corresponds to the end of a branch instruction. In one or more examples, the system includes an instruction pipeline which is configured to fetch a fetch-packet containing a first hyper-block from a first address and a bitwise distance from the entry point of the first hyper-block to a predicted exit point. The instruction pipeline is also configured to execute a first branch instruction of the first hyper-block, wherein the first branch instruction includes an address corresponding to an entry point of a second hyper-block, and wherein executing the first branch instruction comprises moving a program counter from a first exit point of the first hyper-block to the entry point of the second hyper-block. In at least one example, the instruction pipeline is also configured to store, responsive to executing the first branch instruction, the bitwise distance from the entry point of the first hyper-block to the first exit point in the exit history register. The bitwise distance is stored in the history table where it is used to predict the branch exit the next time the first hyper-block is fetched.

BRIEF DESCRIPTION OF THE DRAWINGS

For a detailed description of various examples, reference will now be made to the accompanying drawings, in which.

DETAILED DESCRIPTION

Figure 1:
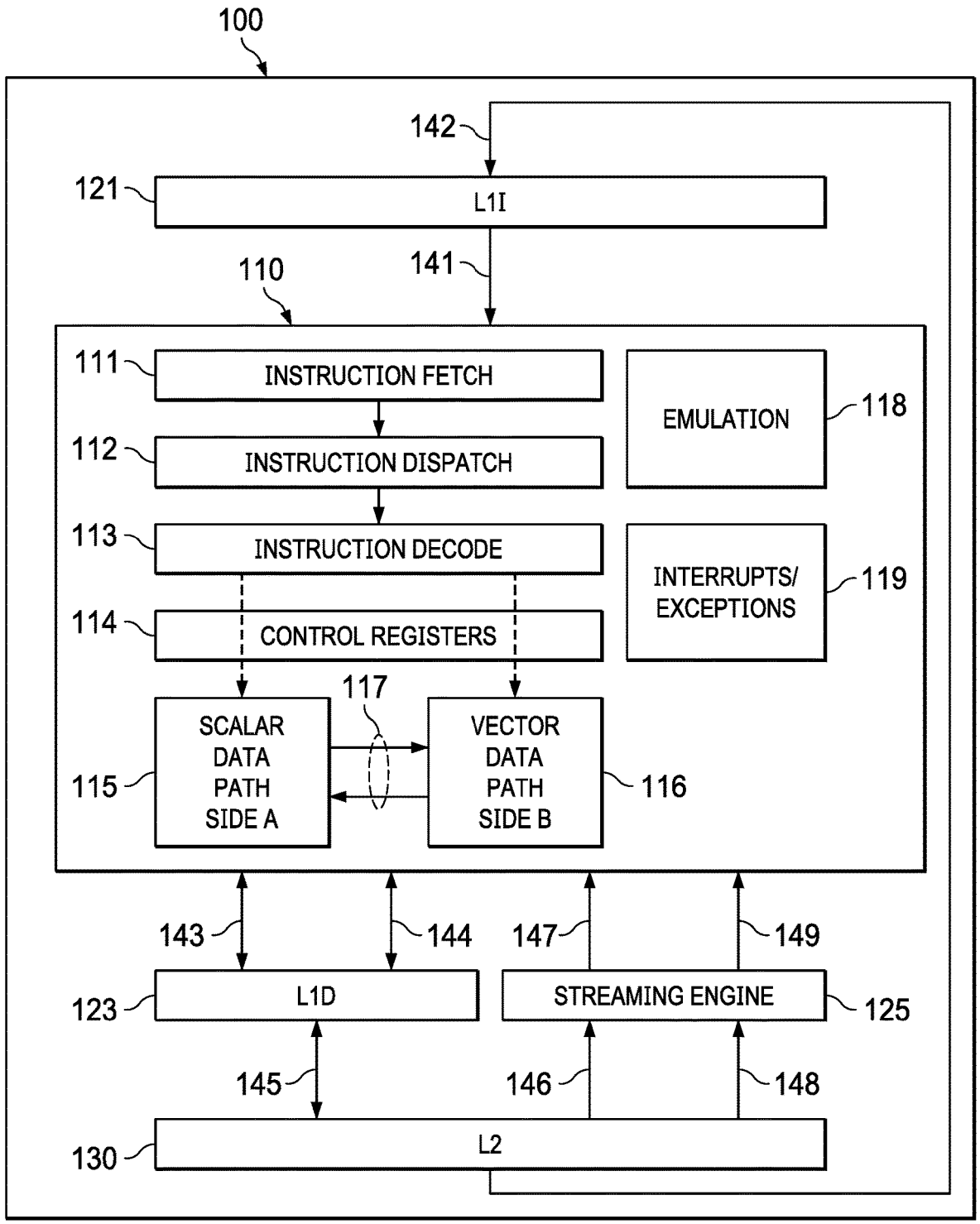
FIG. 1 is a block diagram of a digital signal processor having multiple data paths, in accordance with an example of this disclosure.

When introducing elements of various examples of the present disclosure, the articles "a," "an," and "the" are intended to mean that there are one or more of the elements. The terms "comprising," "including," and "having" are intended to be inclusive and mean that there might be additional elements other than the listed elements. The examples discussed below are intended to be illustrative in nature and should not be construed to mean that the examples described herein are necessarily preferential in nature.

The examples described in this disclosure are neither mutually exclusive nor collectively exhaustive. References to "one example" or "an example" are not to be interpreted as excluding the existence of additional examples that also incorporate the recited features.

When used in this disclosure, the term memory controller includes a digital circuit that manages the flow of data going to and from a computer main memory. The term control unit (CU) refer to a component of a central processing unit (CPU) that directs the operation of the processor. The term program counter (PC) refers to a processor register that stores a value indicative of an address of an instruction to be executed by the processor. The term "medium" includes one or more non-transitory physical media that together store the contents described as being stored thereon. The term "medium" does not include a signal, electrical or otherwise. Examples may include non-volatile secondary storage, read-only memory (ROM), and/or random-access memory (RAM). The terms "application" and "function" refer to one or more computing modules, programs, processes, workloads, threads and/or a set of computing instructions executed by a computing system. Example implementations of applications and functions include software modules, software objects, software instances and/or other types of executable code.

Aspects of this disclosure pertain to digital signal processors (DSP). Digital signal processors include microprocessors which may be optimized for processing streams of data that may be derived from various input signals, such as sensor data, video streams, and voice channels.

The term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors. One or more examples of this disclosure pertain to branch predictors and branch prediction methods. Branch instructions are instructions that, for example, if a given condition is true, causes a program flow to branch to another location in program memory where the code of the taken branch is stored, rather than moving sequentially to the next instruction in program memory. Example branch predictors are used to predict which of multiple possible branches within executable code (e.g., an if-then-else structure) will likely be taken before it is definitively known by the instruction decoding. Branch predictors permit instructions in the predicted branch to be fetched and inserted into the processor's instruction pipeline in advance of resolving the branch condition. Branch prediction advantageously improves the flow in the instruction pipeline which enables efficient control code processing and loops in DSP computations, power saving and memory performance. Mispredicting a branch instruction is inefficient in that the pre-fetched instructions from the incorrect branch must be flushed from the pipeline and the instructions from the correct branch then fetched and brought into the pipeline. An occasional branch misprediction may be acceptable in a processor if numerous correct branch predictions are made for every one misprediction.

In implementations of this disclosure, a prediction is made as to which branch instruction from one or more branch instructions in a sequence of instruction code will cause the program flow to branch (or jump) to a new location, (in other words, predict which of the branches will actually result in a taken branch) so that the instruction fetch logic begins to fetch from the predicted program memory location. Based on the latest prediction, the next taken branch is made and program fetch continues using the same scheme. When the predicted program instructions are returned to the CPU, the CPU dispatches and confirms whether or not the predicted instruction sequence from the branch was correctly predicted before passing to the next pipeline stage. If the prediction is determined to be correct, the prediction is saved in the exit history table and the program sequence continues in execution pipelines; however, if the prediction proves to be incorrect, CPU dispatch logic sends the correct branch target to the branch prediction logic to save in the exit history table, all predictions and the corresponding program fetches are flushed from the pipeline, a new program fetch starts from the correct branch target, and a new prediction starts from the corrected program location.

FIG. 1 illustrates an example digital signal processor (DSP) 100 that includes dual scalar/vector data paths 115, 116, which are connected by data path 117. DSP 100 includes separate level one instruction cache (L1I) 121 and level one data cache (L1D) 123. DSP 100 includes an L2 cache in which both instructions and data can be stored. L2 cache may be implemented using static random-access memory (SRAM) in one implementation. L2 cache is referred to herein as L2 "combined cache." FIG. 1 illustrates a connection between L1I cache and L2 combined cache 130 by way of a bus 142 (e.g., a 512-bit bus). FIG. 1 illustrates a connection between L1D cache 123 and L2 combined cache 130 by way of 145 (e.g., a 512-bit bus). In this example of DSP 100, L2 combined cache 130 stores both instructions to back up L1I cache 121 and data to back up L1D cache 123. In this example L2 combined cache 130 is further connected to a higher level cache and/or main memory using any of a variety of memory system techniques. The size of L1I cache 121, L1D cache 123, and L2 combined cache 130 may be implemented in different sizes in various examples. For example, L1I cache 121 and L1D cache 123 may each be 32 kilobytes, and L2 cache/SRAM 130 may be 512 kilobytes. DSP 100 includes a central processing unit CPU 110. In the example illustrated in FIG. 1, CPU 110, L1I cache 121, L1D cache 123 and L2 combined cache 130 are formed on a single integrated circuit. This single integrated circuit may include other circuits as well.

CPU 110 fetches instructions from L1I cache 121 as controlled by instruction fetch unit 111. Instruction fetch unit 111 determines the next instructions to be fetched and fetches a fetch-packet-sized set of such instructions. The nature and size of fetch-packets are further detailed below. Instructions are directly fetched from L1I cache 121 upon a cache hit (if these instructions are stored in L1I cache 121). Upon a cache miss (the specified instruction fetch-packet is not stored in L1I cache 121), the instructions are fetched from L2 combined cache (if such instructions are indeed in the L2 combined cache). In this example, the size of a cache line in L1 I cache 121 equals the size of a fetch-packet, which is 512-bits. The memory locations of these instructions are either a hit in L2 combined cache 130 or a miss in L2 combined cache. A hit is serviced from L2 combined cache. A miss in L2 combined cached can be serviced from yet a higher level of cache (not illustrated) or from main memory (not illustrated). An instruction hit in L2 combined cache (or higher level cache or main memory) causes the fetched instructions to be supplied to the L1 I cache 121 in the event the instructions need to be fetched again.

In the example of FIG. 1, CPU 110 includes plural functional units to perform instruction specified data processing tasks. Instruction dispatch unit 112 determines the target functional unit of each fetched instruction. In this example, central processing unit 110 operates as a very long instruction word (VLIW) processor capable of operating simultaneously on plural instructions in corresponding functional units. A compiler organizes instructions in execute packets that are executed together. Instruction dispatch unit 112 directs each instruction to its target functional unit. The functional unit assigned to an instruction is completely specified by the instruction produced by the compiler. The hardware of CPU 110 may have no part in this functional unit assignment. In this example, instruction dispatch unit 112 may operate on several instructions in parallel. The number of such parallel instructions is set by the size of the execute packet. This will be further detailed herein below.

In the example of FIG. 1, instruction decode unit 113 decodes each instruction in a current execute packet. Decoding includes identification of the functional unit to perform the instruction, identification of registers used to supply data for the corresponding data processing operation from among one or more register files, and identification of the destination register(s) for the results of the corresponding data processing operation. As further explained below, instructions may include a constant field in place of one register number operand field. The result of such decoding is signals for the control of the target functional unit to perform the data processing operation specified by the corresponding instruction on the specified data.

CPU 110 includes control registers 114. Control registers 114 store information for control of the functional units in instruction fetch 111, instruction dispatch 112, instruction decode 113, scalar data path side A 115, and vector data path side B 116, emulation unit 118, and interrupts/exceptions unit 119. The information stored in the control registers 114 comprise mode information or the like.

The decoded instructions from instruction decode 113 and information stored in control registers 114 are supplied to scalar data path side A 115 and vector data path side B 116. As a result, functional units within scalar data path side A 115 and vector data path side B 116 perform instruction-specified data processing operations upon instruction-specified data and store the results in an instruction-specified data register(s). Each of scalar data path side A 115 and vector data path side B 116 include plural functional units that operate in parallel. Data path 117 between scalar data path side A 115 and vector data path side B 116 permits data exchange therebetween.

CPU 110 includes other non-instruction-based modules. Emulation unit 118 determines the machine state of CPU 110 in response to instructions. This capability will typically be employed for algorithmic development. Interrupts/exceptions unit 119 enables CPU 110 to be responsive to external, asynchronous events (interrupts) and to respond to attempts to perform operations not in the software code sequence, (exceptions).

DSP 100 includes streaming engine 125. In one example, streaming engine 125 supplies two data streams from predetermined addresses cached in the L2 combined cache 130 to register files of vector data path side B of CPU 110. This provides controlled data movement from memory (as cached in L2 combined cache) directly to functional unit operand inputs.

FIG. 1 illustrates example data widths of busses between various parts. L1 I cache 121 supplies instructions to instruction fetch unit 111 via bus 141. Bus 141 is a 512-bit bus in this example. Bus 141 is unidirectional from L1I cache 121 to central processing unit 110. L2 combined cache 130 supplies instructions to L1I cache 121 via bus 142. Bus 142 is a 512-bit bus in this example. Bus 142 is unidirectional from L2 combined cache 130 to L1 I cache 121. L1D cache 123 exchanges data with register files in scalar data path side A 115 and data with register files in vector data path side B 116 via bus 143 and bus 144. In one example, bus 143 is a 64-bit bus and bus 144 is a 512-bit bus. Buses 143 and 144 are illustrated as bidirectional supporting both central processing unit 110 data reads and data writes. L1D cache 123 exchanges data with the L2 combined cache 130 via bus 145. Bus 145 is a 512-bit bus in this example. Bus 145 is illustrated as bidirectional supporting cache service for both central processing unit 110 data reads and data writes.

Processor data requests are directly fetched from L1D cache 123 upon a cache hit (if the requested data is stored in L1D cache 123). Upon a cache miss (the specified data is not stored in L1D cache 123), the data is sought in the L2 combined cache 130. The memory locations of the requested data are either a hit in the L2 combined cache 130 or a miss. A hit is serviced from L2 combined cache 130. A miss is serviced from another level of cache (not illustrated) or from main memory (not illustrated). The requested data may be simultaneously supplied to both L1D cache 123 and CPU 110 to speed subsequent use of the data.

L2 combined cache 130 supplies data of one of the two data streams to streaming engine 125 via bus 146. Bus 146 is a 512-bit bus in this example. L2 combined cache 130 supplies data of another data stream to streaming engine 125 via bus 148. Bus 148 is a 512-bit bus in this example. Streaming engine 125 supplies one or both data streams to functional units of vector data path side B 116 via bus 147 or bus 149 or both bus 147 and bus 149, which are 512-bit buses in this example. Busses 146, 147, 148 and 149 are illustrated as unidirectional from L2 combined cache 130 to streaming engine 125 and to vector data path side B 116 in accordance with this example.

Figure 2:
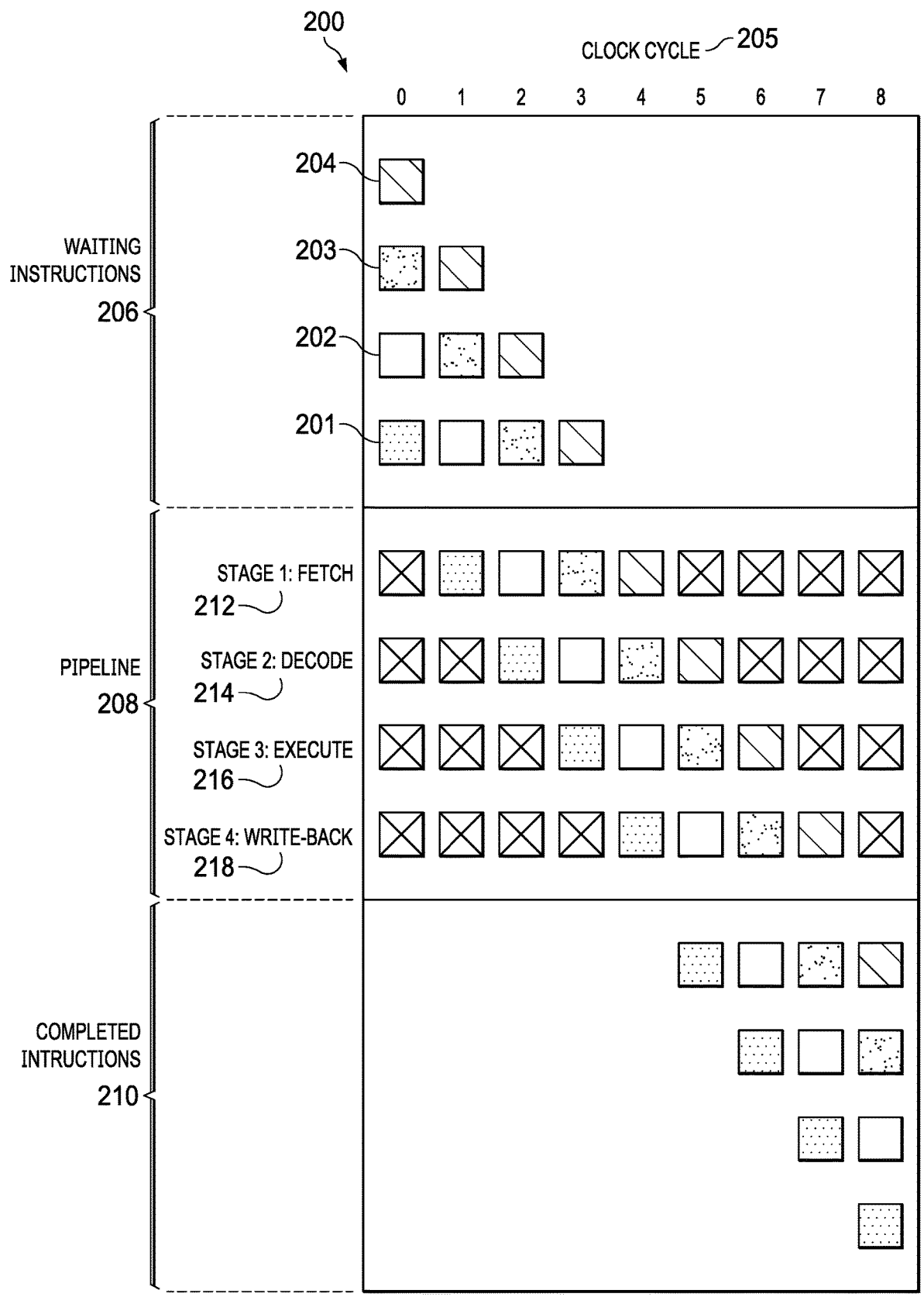
FIG. 2 is a timing diagram of an instruction pipeline, in accordance with an example of this disclosure.

FIG. 2 is a timing diagram of an example control flow 200 for one or more processors of this disclosure. As shown, there are four instructions 201, 202, 203, 204 which are pipelined. The first four rows 206 of timing diagram 200 include those instructions from instructions 201, 202, 203, 204 which are waiting to be pipelined. The next four rows 208 of timing diagram 200 include those instructions from instructions 201, 202, 203, 204 which are currently being pipelined. The last four rows 210 of timing diagram 200 includes those instructions from instructions 201, 202, 203, 204 which have been completed. The nine columns of timing diagram 200 correspond to clock cycles 205 0 (zero) through 8 (eight).

In clock cycle 0 (zero), each of the instructions are waiting (stored) 206 in memory (such as a cache memory). In clock cycle 1 (one), instruction 201 is fetched from memory at stage 1 (one) 212 of pipeline 208. In clock cycle 2 (two), instruction 202 is fetched from memory at stage 1 (one) 212 of pipeline 208, and instruction 201 is decoded at stage 2 (two) 214. In clock cycle 3 (three), instruction 203 is fetched from memory at stage 1 (one) 212 of pipeline 208, instruction 202 is decoded at stage 2 (two) 214, and instruction 201 is executed at stage 3 (three) 216.

In clock cycle 4 (four), instruction 204 is fetched from memory at stage 1 (one) 212 of pipeline 208, instruction 203 is decoded at stage 2 (two) 214, instruction 202 is executed at stage 3 (three) 216, and instruction 201 is written back to memory at stage 4 (four) 218.

In clock cycle 5 (five), instruction 204 is decoded at stage 2 (two) 214 of pipeline 208, instruction 203 is executed at stage 3 (three) 216, instruction 202 is written back to memory, and instruction 201 has been completed 210. In clock cycle 6 (six), instruction 204 is executed at stage 3 (three) 216 of pipeline 208, instruction 203 is written back to memory in stage 4 (four) 218, and instruction 201 and instruction 202 have been completed 210.

In clock cycle 7 (seven), instruction 204 is written back to memory at stage 4 (four) 218 of pipeline 208, and instruction 201, instruction 202, and instruction 203 have been completed 210. In clock cycle 8 (eight), instruction 204, instruction 201, instruction 202, and instruction 203 have left pipeline 208, have been completed 210.

As noted, aspects of this disclosure are directed to branch prediction. When used in this disclosure, the term branch predictor can refer to a digital circuit that tries to predict which way a branch will go before the way is known with certainty. The purpose of the branch predictor is to improve the flow in an instruction pipeline (pipeline 208, for example). For example, it could be the case that execution of instruction 201 can produce different outcomes, depending on the values used when executing instruction 201. A first possible outcome could require that instruction 202 will need to be executed (branch 1). A second possible outcome could require that instruction 203 will need to be executed (branch 2) and a third possible outcome could require that instruction 204 will need to be executed (branch 3). A branch predictor could predict based, for example, on execution history of instruction 201, that it is more likely that instruction 202 will need to be executed than instruction 203 or instruction 204. That is, a branch predictor could predict that branch 1 is the most likely branch that will be taken after instruction 201 is executed. Thus, in clock cycle 1 (one), when instruction 201 enters stage 1 (one) 212 of pipeline 208 (is fetched), the branch predictor predicts that branch 1 is the most likely branch to be taken, and so selects instruction 202 as the next instruction to enter stage 1 (one) 212 of the pipeline 208. The branch predictor could also predict that branch 2 (two) is the most likely branch that will be entered when instruction 202 is executed, and so fetches instruction 203 in clock cycle 3 (three). However, if the branch predictor had predicted that branch 3 (three) is more likely to be taken after branch 1 (one), instruction 204 would have been put into the pipeline 208 in clock cycle 3 (three) instead of instruction 203).

It is, of course possible for a branch predictor to incorrectly predict the branch that is taken (a branch "misprediction"). For example, it is possible that execution of instruction 201 in clock cycle 3 (three) reveals that it will be necessary to execute an instruction other than instruction 202. In that case, rather than taking branch 1 (one) as was predicted, in clock cycle 4 (four) instead of fetching instruction 204, a different instruction will be fetched (not shown). It should be apparent that each of instructions 201, 202, 203, and 204 could each comprise one or more instructions.

Exit Branch Prediction Strategies Using Hyper-Blocks

One or more branch prediction examples of this disclosure involve hyper-blocks. When used in this disclosure, a hyper-block (HB) refers to a sequence of instructions, some of which are predicated, that has no internal transfers of control; an HB is a region of code that has one entry point and no internal control flow. An HB can, however, have multiple exits—branches which cause the program flow of a CPU to leave an HB before reaching the end of the HB.

Examples of this disclosure include one or more branch predictors (BP) which predict which branch of a plurality of branches in an HB will be the branch that causes the program flow to leave the HB. Except when the exit branch that is predicted is the branch actually taken, all other branches are implicitly not taken. When a given branch is accurately predicted to be the first taken branch to exit the HB, that implies that the other possible branches in the HB in question were predicted to not be the first exit branch.

Any exit through a branch instruction (including predicted procedure calls) is called an early exit. If none of the early exits in an HB are taken, the control flow through the HB is completely sequential. All early exits lead to the beginning of a new HB. When the control flow exits an HB the control flow enters the next HB in the program sequence.

In at least one example of this disclosure, a fetch-packet can contain as many as 16 instruction words in 16 corresponding 'word slots'. In some examples, an instruction word is 32-bits wide. A branch instruction may be located in any of the 16 instruction word slots.

Hyper-blocks are consecutively stored in memory. HBs differ from non-HB blocks which have a branch instruction as their last line. HBs can contain multiple branch instructions, while non-HB blocks contain only one branch instruction. Thus, an HB can include one or more basic blocks, and an HB can be composed of multiple HBs. A program flow moving sequentially through an HB (taking no branches) may be referred to as a "fall through," as in "the flow fell through the HB(s)."

Figure 3:
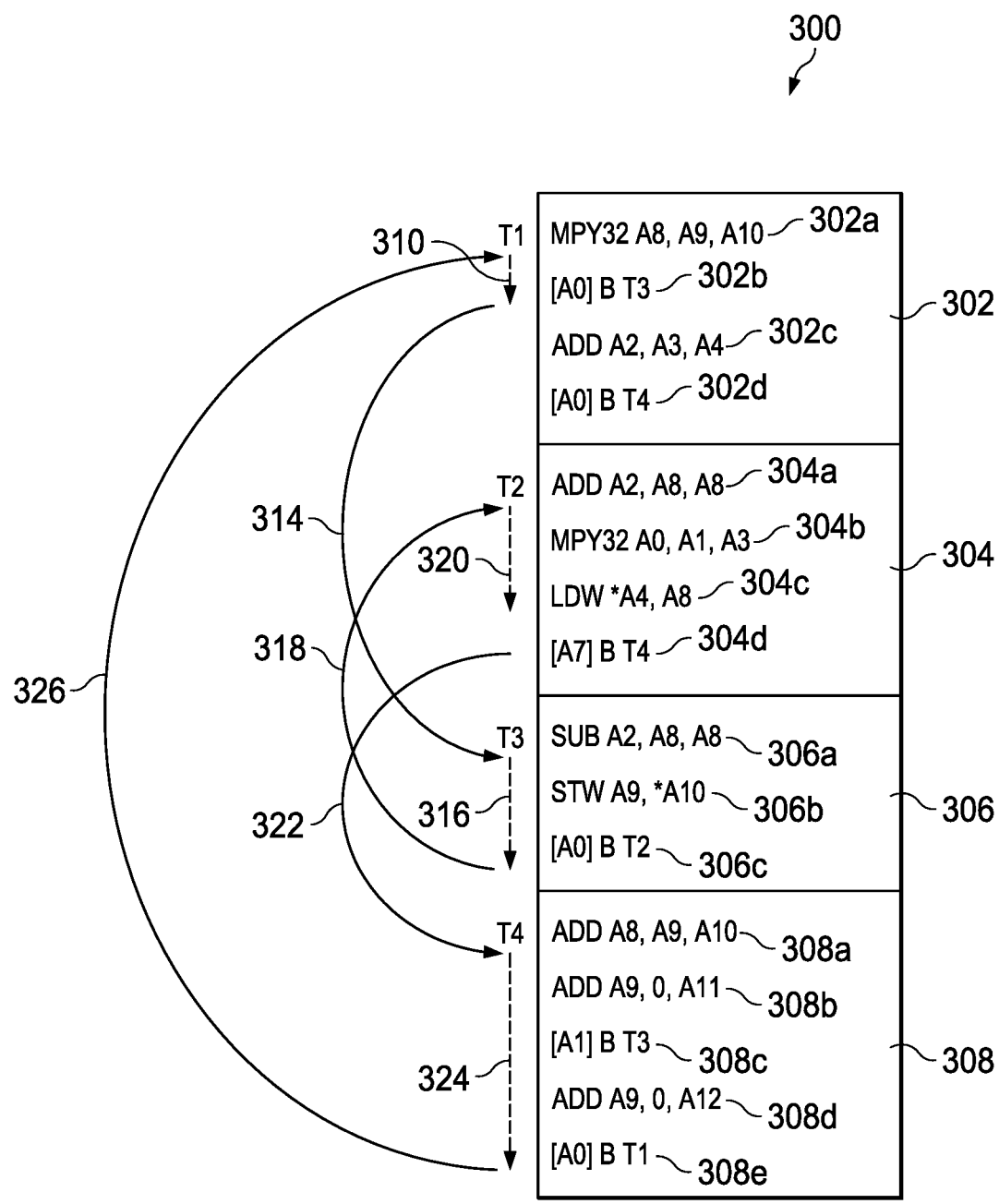
FIG. 3 is a flow diagram of a hyper-block control sequence, in accordance with a method of this disclosure.

FIG. 3 is a flow diagram of a hyper-block (HB) control flow method 300, in accordance with an example of this disclosure. In the example illustrated in FIG. 3, the HB control flow method 300 includes four HBs, namely, HB1 302, HB2 304, HB3 306, and HB4 308. By definition, and as noted, HBs have one entry point each. The entry point of HB1 302 is T1 310; the entry point of HB2 304 is T2 320; the entry point of HB3 306 is T3 316; and the entry point of HB4 308 is T4 324. HBs can, however, have multiple exit points.

HB1 302 contains a multiply instruction in the first line 302a of HB1, a branch instruction in the second line 302b, an add instruction in the third line 302c, and another branch instruction in the fourth line 302d of HB1 302. Line 302b means, "if condition [A0] is true, take the branch", "if condition [A0] is true, jump to HB3" and "if condition [A0] is true, go to entry point T3;" each of these statements is identical.

HB2 304 has an add instruction in its first line 304a. HB2 304 includes a multiply instruction in the second line 304b, a load instruction in the third line 304c, and a branch instruction in the fourth line 304d. HB3 306 has a subtract instruction in its first line 306a. HB3 306 also includes a store word instruction in the second line 306b and a branch instruction in the third line 306c. HB4 308 has ADD instructions in its first line 308a, second line 308b, and third line 308d. HB4 includes branch instructions in the third line 308c and in the fifth line 308e.

An HB can be exited simply because all the instructions of that HB have been executed. An HB can also be exited through a branch instruction, which moves the control flow 300 to a new HB. Any exit through a branch instruction (including predicated procedure calls) is termed an 'early exit.' Thus, the possible exits for an HB can include all its possible early exits as well as an exit due to a sequential program flow (e.g., without branching). In example control flow method 300, HB1 302 has three possible exits. The first possible exit route 314 is through branch B-T3 in line 302b of HB1. Exit route 314 will be taken by control flow 300 when the conditional statement, if condition [A0] is true at line 302b. If prediction [A0] is not true, the control flow moves to line 302c of HB1 302. The second possible exit route is through branch BT-4 in line 302d. The third possible route is to the next hyper-block 304 in the sequence, HB2, at line 304a.

Similarly, HB2 304 has two possible exit routes. At line 304d, the control flow 300 could jump 322 through branch B-T4 to entry point T4 324 of HB4 308 at line 308a. The other way that the control flow 300 can exit HB2 is by moving to the next hyper-block in sequence, HB3 306 at line 306a. If no branches are taken, the control flow 300 will simply move line by line through HB1 302, HB2 304, HB3 306 and HB4 308 in sequence. In that sense, any two or more of HB1 302, HB2 304, HB3 306 and HB4 308 could be considered a hyper-block, so long as they are adjacent. For example, all four of HB1 302, HB2 304, HB3 306 and HB4 308 are considered a single hyper-block if the program flow moves sequentially from line 302a to entry point T4 324 of HB4 at line 308a. As a further example, HB1 302 and HB3 306 cannot be construed as a hyper-block unless the program flow moves sequentially from line 302d of HB1 302 through to line 306a of HB3 306. If any of the branches in HB1 302 or HB2 304 were taken, the flow would not be sequential.

When HB entry points T1 310, T2 320, T3 316, T4 324 are reached through early exits—due to branch instructions (instead of through sequential program flow)—these entry points are called branch targets.

In the example shown in FIG. 3, the control flow is as follows: the CPU executes the multiply instruction at line 302a and moves to line 302b, at which point the CPU determines that condition [A0] is true. As a result of condition [A0} being true, the CPU branches (jumps) 314 to HB3 at line 306a. The CPU then fetches and performs the instructions in HB3 306 starting with the line 306a. The CPU continues executing instructions within HB3 306 until eventually determining that condition [A0] is true at line 306c, which causes a branch 318 to HB2 304. The CPU then executes the instructions of HB2 304 in lines 304a, 304b, 304c, and 304d in sequence. The instruction at line 304d involves an assessment of [A7] condition. In this example, [A7] is determined to be true thereby causing a branch 322 to entry point T4 324 of HB4 308.

In examples of this disclosure, when a CPU detects that the branch target instruction at line 302a is present, the CPU predicts the relative location of the branch instructions in the hyper-block based on the exit history saved in an exit history table. Based on the program counter (PC) pertaining to the instruction in the first line 302a of HB1 302, the branch predictor predicts that branch [A0], corresponding to HB3 306 will be taken after the instruction in the first line 302a of HB1 302 is executed. Thereafter, first branch [A0] B-T3, having been correctly predicted is taken at line 302b. Taking jump 314 from first branch [A0] B-T3 implies that HB3 306 is the next branch target address after the exit from HB1 302. Further, predicting the first branch [A0] B-T3 to be an early exit of HB1 302 also indicates that the second branch [A0] B-T4 is predicted as a "not taken" branch by the branch predictor. In other words, if the branch predictor predicts the second branch [A0] B-T4 as the exit of HB1 302, it means that the branch predictor predicts the first branch [A0] B-T3 is a "not taken" branch. It is only necessary that the branch predictor predicts the sequence number (program counter (PC) of a branch). The branch predictor need not decode the instructions of the predicted branch to make a prediction.

In one or more examples, a branch predictor ("BP") of this disclosure (e.g., BP 400 in FIG. 4A) stores the offset distance from an HB's entry point, (such as T1 310 in FIG. 3). Taking FIG. 3 as an example control flow, the BP 400 would store the distance from entry point T2 (320) to the instruction at line 304d. When the control flow accesses T2 (320), the BP looks ahead by the predicted distance to branch instruction 304d, and, seeing that T4 324 is where the control flow will go if the condition [A7] is true, HB4 308 will be put into the instruction pipeline. Similarly, the distance to the mostly likely branch (for example the instruction at line 308e) in HB4 308 can tell the fetch unit (e.g., instruction fetch unit 111 of FIG. 1) of the processor that that the instructions of HB1 302 should be put in the pipeline.

Figure 4A:
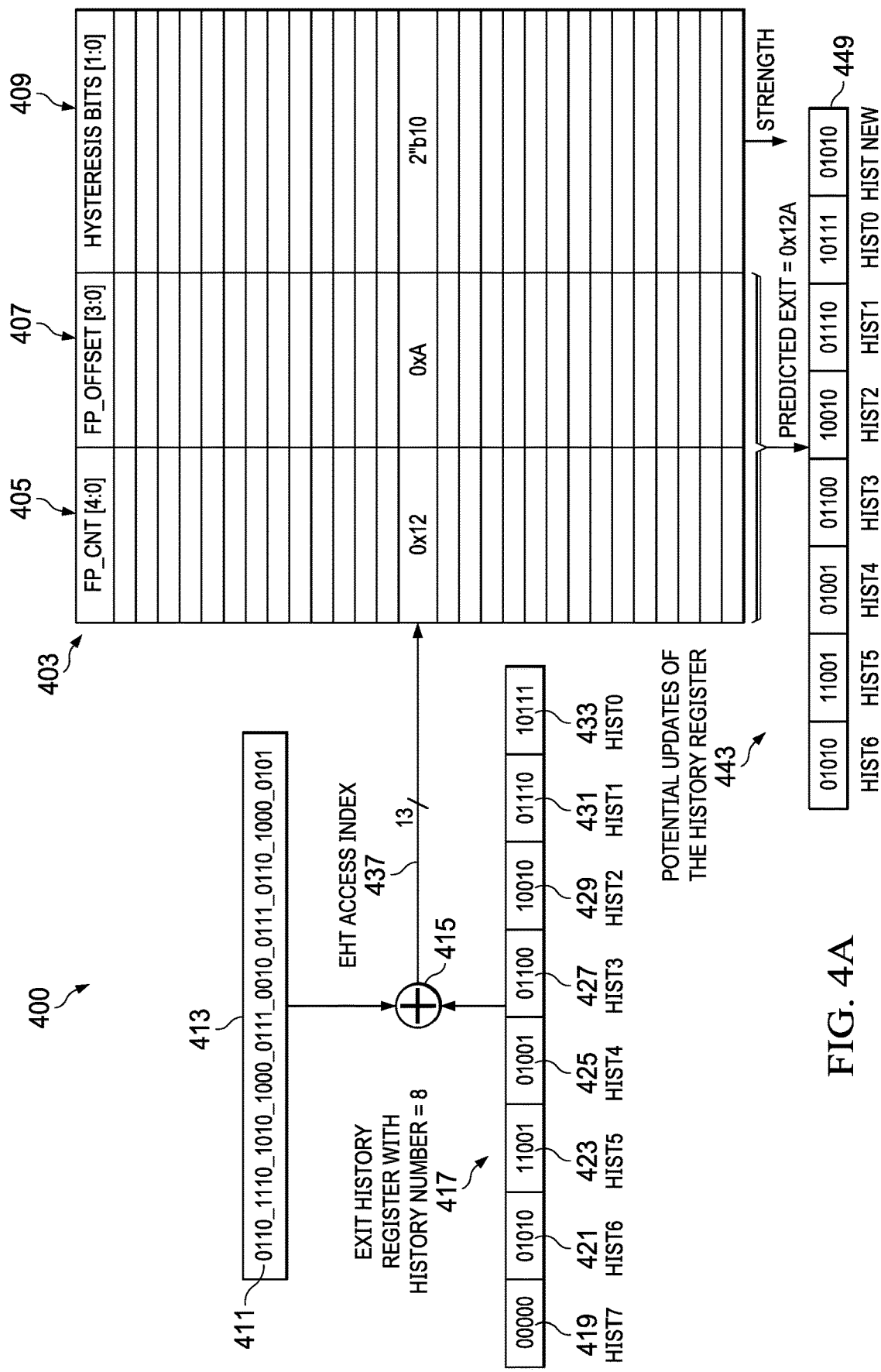
FIG. 4A is a diagram of a two-level exit history based branch prediction scheme, in accordance with an example of this disclosure.

FIG. 4A is a diagram of a two-level exit history based branch predictor (BP) 400, in accordance with an example of this disclosure. The first level of BP 400 includes an exit history register 417. The exit history register 417 saves history information of offset+1-bit distance. The second level of BP 400 includes an exit history table (EHT) 403.

Register 413 contains the address 411 of the entry point of the next HB to be entered. BP exit history register ("EHR") 417 contains the history of the exit point of the HB mapped to address 411. The exit history register 417 includes multiple history fields 419, 421, 423, 425, 427, 429, 431, and 433. The history value of the most recent HB in history field 433 stores the offset of BT in the fetch-packet which is a, for example, 4-bit value plus one-bit least significant bit ("LSB") of the distance (in fetch-packet unit) from the HB entry point to the exit point. Examination of exit history register 417 reveals that the first exit branch in the recorded history of exit history register 417 was from offset distance in history field 419, the second was from history field 421, the third from history field 423, the fourth from history field 425, the fifth from history field 427, the sixth from history field 429, the seventh from history field 431, and the eighth (and most recent) from history field 433. In one or more implementations of this disclosure, the length of the exit history register 417 can be (re)configured by a user.

Branch predictor 400 exclusive-ORs (XORs) 415 the 48-bit value from the exit history register 417 formed by concatenating the values in the history fields 419, 421, 423, 425, 427, 429, 431, and 433 with the 48-bit address 411 within register 413, and uses the resulting XOR value as an index 437 to an exit history table (EHT) 403. In some implementations, the 48-bit XOR'd value is folded (e.g., hashed) into a 13-bit index value 437.

When the address 411 of the HB is XOR'd with the value from the history fields 419-433 of the exit history register 417, the folded 13-bit index 437 is used to access the EHT 403. EHT 403 is a lookup table which saves the confirmed exit history and is used to produce the prediction of the exit point for the HB mapped to address 411. In one example, the predicted exit point includes three fields: a bitwise distance between the entry point and the exit point in the number of fetch-packet counts, an offset from the exit branch instruction in its fetch-packet, and a confidence value of the prediction. The value in field 449 of register 443 is the value 01010 and is the fetch-packet count with the offset value read from the EHT 403. This value is truncated to a 5-bit history value before the value is placed in exit history register 417. The other exit values from the exit history register 417 are shifted to the left. Because the registers 417 and 443 store eight branch identifiers (offsets, rather than branch numbers or addresses) the earliest history value 00000 in history field 419 of register 417 is removed and thus does not appear in register 443. Register 443 stores the updates of the exit history register 417 after the prediction is made.

The exit history table 403 also stores a two-bit hysteresis value (corresponding to a level of confidence) in the column 409. The first column 405 of the EHT 403 stores the distance. Column 407 stores the offset from the corresponding branch. A hysteresis score of zero (00) means that the branch is usually not taken (indicating a low likelihood that the branch will be the exit branch); a hysteresis score of two (10), for example, means the branch is frequently taken (indicating that it is moderately likely that the branch will be taken, more so than a branch with a hysteresis score of zero); and a hysteresis score of three (11) means that the branch is taken very frequently. A branch frequently taken will have a lower probability of being replaced by new predictions. A branch rarely will likely have to be replaced by a new prediction if it were taken. If a misprediction occurs due to using a weakly taken branch, this entry in exit history table 403 will be removed (e.g., hysteresis will be reduced to 00). When a newly confirmed exit history is generated, before the newly confirmed history is written to the exit history table 403, the hysteresis bit(s) is used to make sure the old exit history can be replaced by the new history. The fetch-packet, which contains the address of the HB, also contains the (predicted) offset number, (plus one bit of the search packet size) which may be part of the history.

The scheme illustrated in the example of FIG. 4A is advantageous because saving and calling distances has lower computational overhead than using branch numbers. In the scheme illustrated in FIG. 4A, the branch predictor does not need to store the address of all branches and the does not need to count the branches. Counting branches requires decoding the branch instructions. In at least one example, if the exit history table 403 outputs an erroneous condition, the control flow is put into an incremental mode (sequential mode).

Figure 4B:
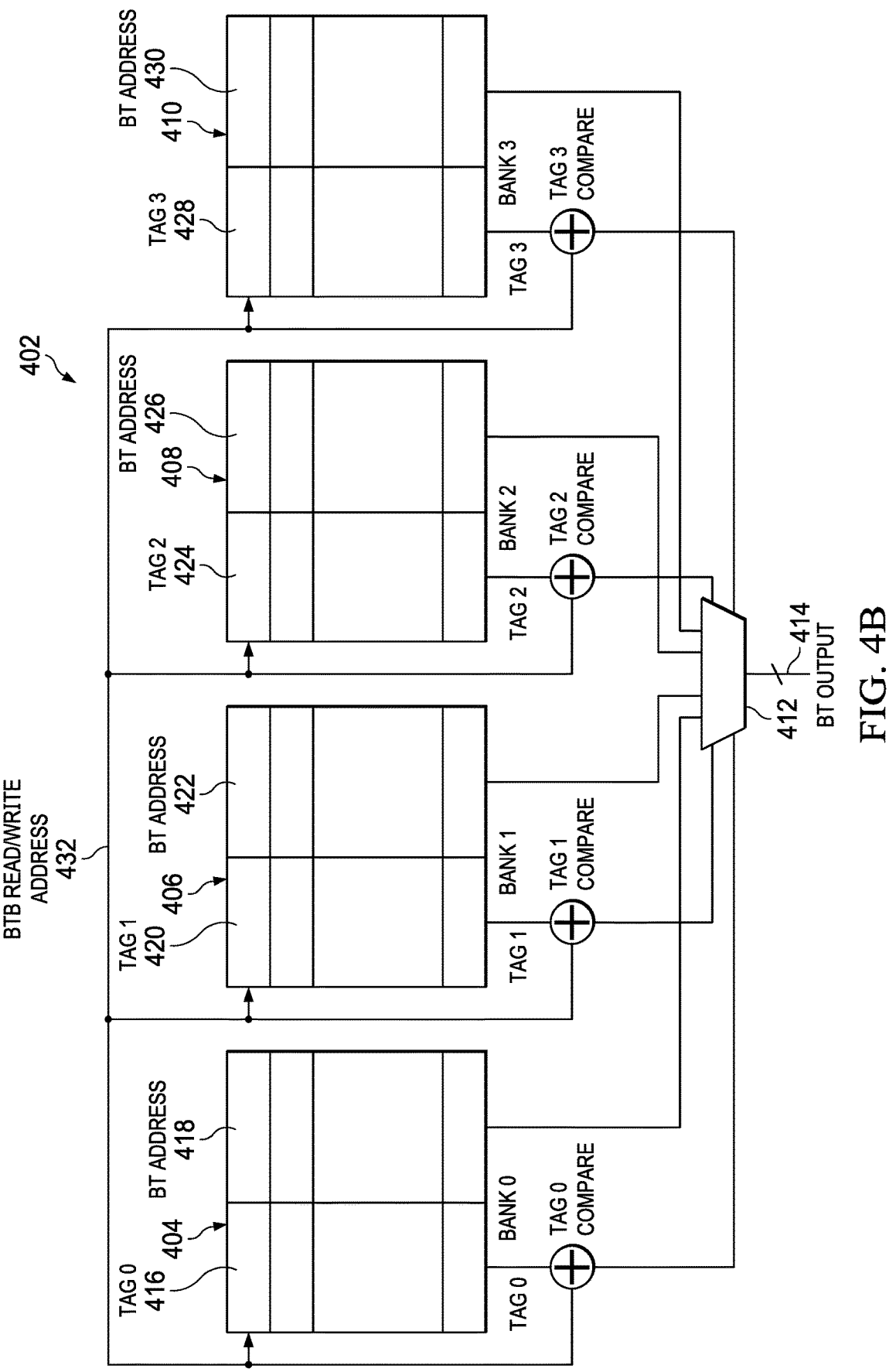
FIG. 4B is a diagram of an example branch target buffer which can be utilized in accordance with the two-level exit history based branch prediction scheme of FIG. 4A.

FIG. 4B is a block diagram of a branch target buffer 402, which can be utilized in accordance with the two-level exit history based branch prediction scheme of FIG. 4A, in accordance with an example of this disclosure. Branch target buffer 402 in this example includes a four-way associative cache. Branch target buffer 402 contains four banks, bank 0

(zero) 404, bank 1 (one) 406, bank 2 (two) 408, and bank 3 (three) 410. The banks 404, 406, 408, and 410 communicate with mux 412. Banks 404, 406, 408, and 410 each store tag information and branch target information.

Banks 404, 406, 408, and 410 receive branch target buffer read/write address information 432 each time the control flow exits from a branch. Each time the control flow takes an early exit from an HB, the target address of the given branch is written into the branch target buffer 402, where the target address is used to read the entry point of the next HB that will be entered by the control flow.

In the example illustrated in FIG. 4B, the first column 416 of bank 0 (zero) 404 contains tag 0 (zero) values and the second column 418 contains branch target information corresponding to the tag 0 (zero) information in column 416. The first column 420 of bank 1 (one) 406 contains tag 1 (one) information and the second column 422 of bank 1 (one) 406 contains branch target information corresponding to the tag 1 (one) information in column 420. The first column 424 of bank 2 (two) 408 contains tag 2 (two) information and the second column 426 of bank 2 (two) 408 contains branch target information corresponding to the tag 2 (two) information in column 424. The first column 428 of bank 3 (three) 410 contains tag 3 (three) information and the second column 430 of bank 3 (three) 410 contains branch target information corresponding to the tag 3 (three) information in column 428.

For the exit history register 417, assuming that the value of [A0] is one/true ([A0]=1), the value of [A7] is one/true ([A7]=1), and that the value of [A1] is zero/false ([A0]=0), and that the control flow has entered HB1 302 a first time, control flow will exit HB1 302 at line 302b because [A0]=1 and control jumps 314 to HB3 306 (T3 316). The next branch exit that the control flow will take is at line 306c, where, since [A0]=1, the control flow will jump 318 to HB2 304. When the control flow encounters the instruction at line 304d of HB2 304, because [A7]=1, the control flow will branch 322 to T4 324. The control flow will not exit to T3 at line 308c because [A1]=0. The control flow will instead exit 326 to HB1 302 because the instructions at line 308e indicate that if [A0] is one/true, then the program flow should jump 326 to T1 310.

Having reached HB1 302 a second time, the control flow will—assuming that the values of [A0], [A7] and [A1] have not changed—repeat the pattern (P1) that the control flow had after the control flow entered HB1 302 at the first time. Moreover, when the program flow reaches HB1 302 a second time, the branch predictor will have learned pattern P1 and will predict that the control flow starting the second time will follow pattern P1. Because values [A0], [A7] and [A1] have not changed, the control flow will follow the same pattern (P1) and exit 326 from line 308e to T1 310 a third time. If the values of [A0], [A7] and [A1] remain unchanged, after the control flow enters HB1 302 the third time, the control flow will again repeat the pattern (P1), which means the control flow will exit 326 from line 308e to T1 310 a fourth time.

Control flow will enter HB1 302 a fourth time. Again, since [A0]=0, the control flow will exit 314 at 302b to T3 316. The distance from the entry point T1 310 to the exit point of line 302b is distance DIS1. When the control flow exits 314 at 302b to T3 316, the branch predictor generates a corresponding history number (for example, HIST-T1). The exit history register is updated to include HIST-T1. HIST-T1 is also placed in the branch target buffer, which predicts that T3 316 is the next hyper-block entry point. The address corresponding to T3 416 is XOR'd with the current number in the exit history register (which contains HIST-T1). The result of the XOR operation is used to index the exit history table 303 as explained above.

The control flow jumps 314 to T3 (HB3 306). The distance from T3 to the branch instruction, "if [A0] equals zero, jump to T2," at line 306c is distance DIS3. When the control flow exits HB3 306 the branch predictor generates HIST-T3 corresponding to DIS3. History register is updated to include HIST-T3, shifting HIST-T1 to the left (while also shifting the other numbers in exit history register leftward.) DIS3 also goes to the branch target buffer, where it will be used to predict the next hyper-block entry point (the next branch target).

Figure 5A:
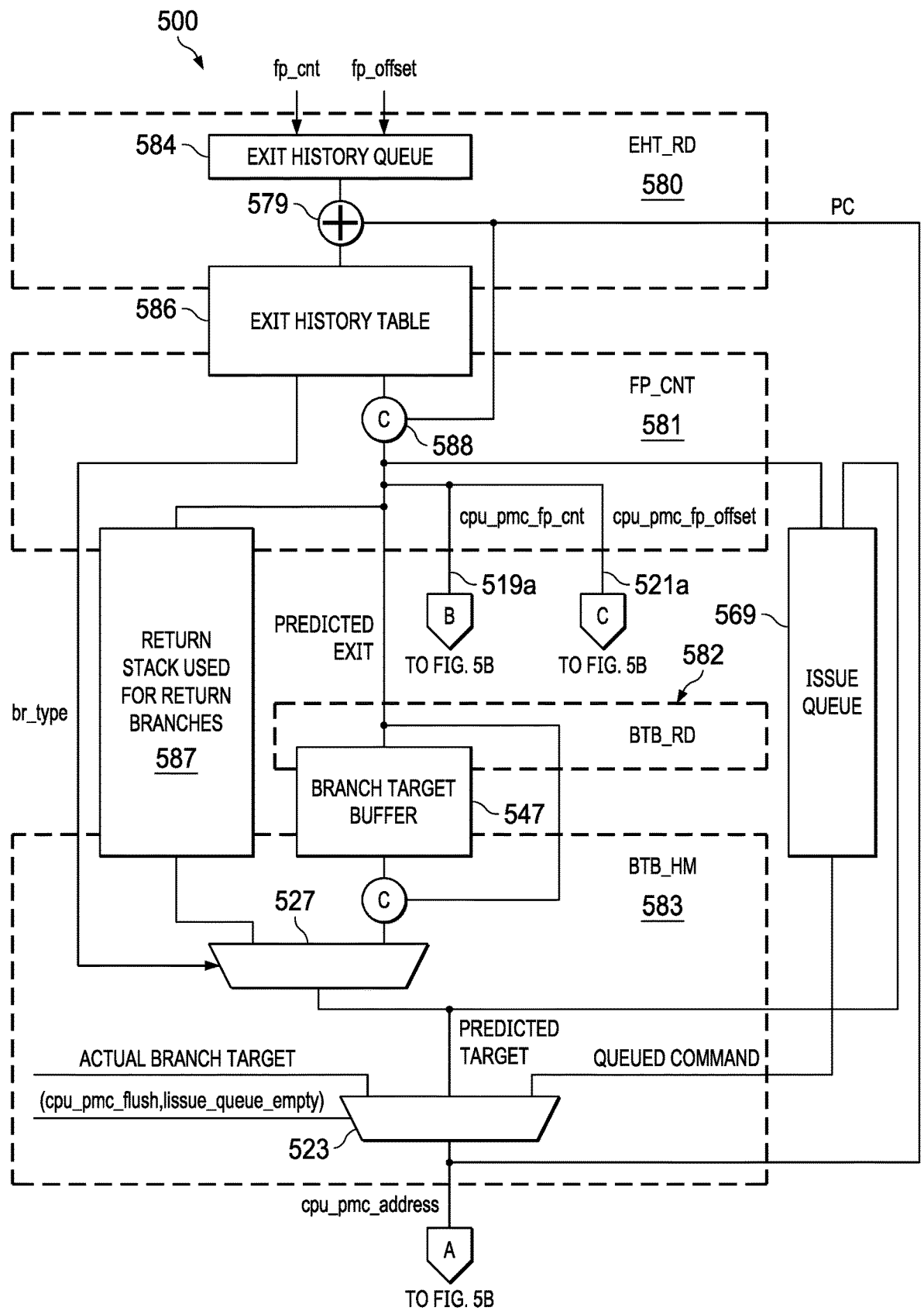
FIGS. 5A-5B are block diagrams illustrating a branch prediction circuit architecture, in accordance with an example of this disclosure.
Figure 5B:
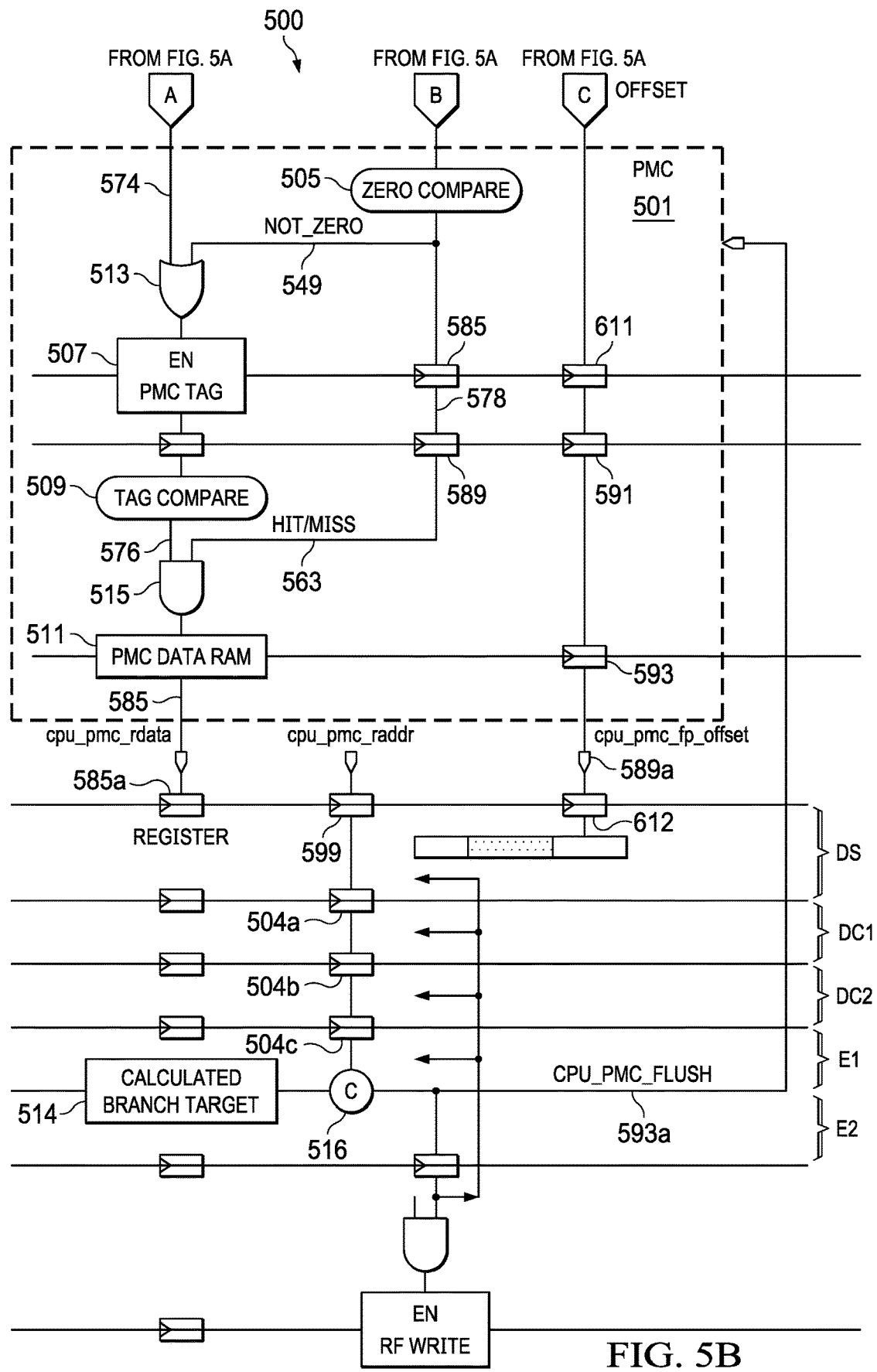

FIGS. 5A-B are block diagrams illustrating a branch predictor 500 in accordance with an example of this disclosure. The BP 500 can be a component of a digital signal processor (DSP) which interacts with a central processing unit (CPU). The BP 500 can be a component of a CPU of a DSP. In at least one example of this disclosure, a DSP includes at least one program address generation (PRG) block. In one or more examples, a PRG block is an execution unit inside the CPU that calculates addresses used by the CPU to access main memory. A CPU can have a front-end pipeline structure which is divided into three main phases: 1) a program fetch phase; 2) a program dispatch phase; and 3) a program decode phase. In one or more examples, the PRG block generates a program address before sending fetch instructions to the program memory. In one or more examples, a PRG block includes a branch predictor to improve the efficiency of the DSP. A BP 500 can be a component of a PRG block of a CPU (e.g., CPU 110).

Example branch predictors BP 500 of this disclosure track the distance between the entry point of a HB (of which there can be only one) and exit point. Starting from the first entry point of the first instruction of the program sequence, the BP 500 predicts the early exit of the HB by looking up a hash table called exit history table (EHT). The EHT table provides the number of execute packet sizes and offset of the exit point of the HB. This is the command sent to a program memory controller (PMC) in the form of a "fetch-packet count" cpu_pmc_efp_cnt and "fetch-packet offset" cpu_pmc_efp_offset. With the known entry point address and distance to the exit point, BP calculates the execute packet address of the predicted branch to be taken before looking up in a Branch Target Buffer (BTB) to find the branch target address. If a BTB look up results in a hit, the predicted branch target address is sent to the PMC as cpu_pmc_fp_caddr which is a, for example, 47-bit value. Due to the sequential lookups in two different tables, the branch target address and fetch-packet count+offset may not be issued in the same cycle. Together they form a complete fetch-packet request pair from CPU to PMC. If the BTB lookup is a hit, the branch target address is read and sent to PMC. This is also the entry point of the next HB. The BP 500 then starts the next prediction using the new entry point of the new HB, and the loop continues until a miss in either cached table is found, or a miss prediction is found.

As noted, a BP (e.g., BP 500) is used to predict the resulting path from a branch (for example, an if-then-else structure) before the path is definitively known with certainty when the CPU decodes the branch instruction in question. A purpose of the BP (500) is to improve the flow in the instruction pipeline which promotes efficient control code processing and looping for digital signal processing computations of the CPU.

In the example illustrated in FIGS. 5A-B, BP 500 includes a programmable memory controller (PMC) 501. The naming convention used for communications (transactions) in FIGS. 5A-B derives from the fact that CPU, in some examples, is the master of the transaction, and the PMC 501 is the slave which services packet fetch requests from the CPU. All signals in FIGS. 5A-B are named according to a <master_side_component>_<slave_side_component>_ <signal_name> pattern. The direction of a signal does not change the master-slave relationship between CPU and BP, and hence the naming convention applies to signals regardless of their direction. Signal direction is indicated by input/output relative to the components, either master (CPU) or slave (PMC).

FIG. 5A includes exit history table read (EHT_RD) logic 580, fetch packet (FP) count logic 581, branch target buffer (BTB) read logic 582, and BTB hit/miss (BT_HM) logic 583. An exit history queue (EHQ) 584 and EHT index generator 579 are included as part of the EHT_RD logic 580. Values in the EHQ 584 and PC are XORed together by EHT index generator 579 to compute a 13-bit EHT index. The index is used to select a set in an Exit History Table (EHT) 586 which comprises two separate entries. During the ext cycle, comparator 588 is used to compare the tags of both entries against the tag that is generated from a folded version of the hyperblock starting PC. When a match is found, the fp_cnt, fp_offset, br_type, and hysteresis are read out of the matching entry. This combination of fields represents the predicted branch at the end of the hyperblock that began at the PC used to index into the EHT 586. The exit PC of the branch is determined by adding the fp_cnt to the hyperblock start PC and concatenating the offset into its slot in the PC. At this point depending on the br_type, the BP may go to a Return Stack 587 or the BTB 547 to get the target address of the branch. If the br_type points to the BTB 547, then the BP will index into the BTB 547 using the exit address calculated from the EHT entry and the hyperblock starting point. During the next cycle, if a hit is generated then the target address of the exiting branch is predicted using that BTB entry. From the BP's point-of-view, the next prediction can now begin with the target address being the new starting hyperblock address. The fp_cnt/offset information found in the EHT 586 is also added to the EHQ 584 before the next EHT index is generated.

When the br_type from the EHT 586 designates the branch as a return, the BP then decides to use the Return Stack 587 instead of the BTB 547 to find the target address. When a target is requested from the Return Stack 587, the Return Stack simply pops off the next entry which is then used as the target address. At this point, and in a similar way to determining a prediction with the BTB 547, the BP can now start the next prediction with the target address being the next hyperblock starting address and the EHT information shifted into the EHQ 584.

The BP runs mostly independently from programmable memory controller (PMC) 501 (FIG. 5B). In order to send requests to the memory subsystem the branch predictor sends these commands in chunks as different parts of the request become available so that PMC 501 can start processing them as soon as possible. One of the first pieces of information that is sent to PMC 501 is the starting address. This address is the hyperblock's starting address. Two cycles later, once the BP has read the EHT 586, it also sends the fp_cnt and fp_offset to the PMC 501, so it knows the number of fetch packets that are to be returned to the CPU. Two cycles after that, the BP will have started another prediction and it will send a new base address (the target of the first prediction) and will repeat the above process until the CPU can no longer make another prediction. Once the CPU cannot make any more predictions it will send cpu_pmc_inc_mode to indicate that PMC 501 should continue incrementally fetching from where it was until a flush indicator is sent.

On occasions where PMC can no longer accept commands because it is waiting from responses from further down in the memory system it is possible that it will stop accepting commands from the BP. In this case the branch predictor may still continue predicting but will store the pending commands to the PMC 501 in an Issue Queue. Once the PMC 501 is ready to accept commands the queue will begin emptying. The branch predictor will try to predict, for example, eight hyperblocks ahead of current execution. At that point it will stall and wait for either a confirmation or a flush.

Flushes occur when the BP makes an incorrect prediction. This is determined when the offending branch is in E1 as this is when branch targets are confirmed. If the confirmed branch target does not match the predicted one sitting in DC2 then a flush is triggered. A flush restarts the branch predictor and the PMC 501 from the correct address.

The branch predictor will first flush any pending predictions in the EHQ 584 and Issue Queue 569 before starting predictions from the new, corrected PC. When removing predicted entries from the EHQ 584 all that will be left are the last n (e.g., 8) confirmed hyperblocks. The PMC 501 will throw out any outstanding requests and start processing them from the new PC.

While using the BTB 547 to determine target addresses of normal branches and calls works well, it may not work well for returns. The reason is that a function is usually called from multiple code locations, so the BTB 547 would only be able to hold the last return address. However, the Return Stack 587 solves this problem. The Return Stack 587 store up to the last n (e.g., 8) return addresses on a stack. When a return is predicted, the most recent return address is popped off the stacked and used as the target prediction. Items are also popped off the stack when a return that was not predicted is executed just to maintain the correct stack ordering. The stack is pushed to either when a call that wasn't predicted is executed or when a call is predicted.

Referring to FIG. 5A, BTB_HM also includes multiplexers 527 and 523. Multiplexer 527 is controlled by the br_type from the EHT 586 to thereby select either the Return Stack's output or the BTB's output as the predicted target to multiplexer 523. Multiplexer 523 sends CPU_PMC_ADDR signal 574 to OR gate 513 within PMC 501.

Signal CPU_PMC_FP_CNT 519a is provided to the PMC 501 comparator 505, which compares signal 519a to a value of 0. Comparator 505 outputs signal 549 (indicative of signal 519a not being equal to 0) to an input of OR gate 513 and to register 585. If either signal CPU_PMC_FP_CNT 519a or signal 549 is 'true,' OR gate 513 will send a 'true' signal to PMC tag block 507, otherwise OR gate 513 will send a 'false' signal to PMC tag block 507. PMC tag block 507 communicates with tag comparator 509, which outputs signal 576 to AND gate 515. Register 585 sends signal 578 to register 589, which in turn sends signal 563 to AND gate 515. If both signal 576 and 563 are 'true,' AND gate 515 will output a true to PMC Data RAM 511. PMC Data RAM 511 sends signal cpu_pmc_rdata 585 to register 585a.

CPU_PMC_fp_offset signal 521a to the PMC 501. CPU_PMC_fp_off set signal 521a goes to register 611, register 591, and register 593, which causes PMC 501 to send signal Cpu_pmc_fp_offset 589a to register 612. PMC 501 also sends signal Cpu_pmc_raddr to register 599, register 504a, register 504b, and register 504c as shown. Signal Cpu_pmc_raddr 587a also goes to comparator 516, which compares Cpu_pmc_raddr to the calculated branch target value 514. Based on Cpu_pmc_raddr and the calculated branch target value 514, comparator 516 sends signal CPU_PMC_Flush 593a to the PMC 501.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

GLOSSARY

BP branch predictor
BTB branch target buffer
CPU central processing unit
DSP digital signal processor
EHT exit history table
HB hyper-block
PC program counter
PMC programmable memory controller
PRG program address generation

What is claimed is:

1. A system, comprising:
a processor comprising an exit history register, the processor coupled to a memory, the memory storing an exit history table and a plurality of hyper-blocks, each hyper-block including:
at least one branch instruction;
exactly one entry point; and
at least one exit point, wherein each of the at least one exit point corresponds to
a respective branch instruction of the at least one branch instruction; and
an instruction pipeline of the processor, the instruction pipeline configured to cause the processor to:
fetch a fetch-packet that includes a set of instructions of a first hyper-block of the plurality of hyper-blocks starting from the entry point of the first hyper-block and ending at a predicted exit point of the at least one exit point of the first hyper-block based on a first bitwise distance between the entry point of the first hyper-block and the predicted exit point;
execute a first branch instruction of the first hyper-block, wherein the first branch instruction has a target address corresponding to the entry point of a second hyper-block of the plurality of hyper-blocks, and wherein executing the first branch instruction comprises changing a value of a program counter from a first exit point of the at least one exit point of the first hyper-block to the entry point of the second hyper-block; and
store, responsive to executing the first branch instruction, a second bitwise distance from the entry point of the first hyper-block to the first exit point in the exit history register.

2. The system of claim 1, wherein the instruction pipeline is further configured to cause the processor to determine that the first exit point corresponds to the predicted exit point, and based on the determination, store the first exit point in the exit history table.

3. The system of claim 1, wherein the instruction pipeline is further configured to cause the processor to identify an address corresponding to the entry point of the second hyper-block as the target address of the first branch instruction.

4. The system of claim 1, wherein the instruction pipeline is further configured to cause the processor to determine that the first exit point does not correspond to the predicted exit point, and based on the determination, flush one or more values in the exit history register.

5. The system of claim 1, wherein the instruction pipeline is further configured to cause the processor to:
perform an exclusive-or operation between each bit of an address corresponding to the entry point of the second hyper-block and each bit in a word in the exit history register; and
index the exit history table with at least some portion of a result of the exclusive-or operation.

6. The system of claim 5, wherein the instruction pipeline is further configured to cause the processor to retrieve an indexed value from the exit history table, the retrieved indexed value corresponding to a predicted exit point of the second hyper-block.

7. The system of claim 1, wherein the exit history register is a virtual register of a reconfigurable width.

8. A method, comprising:
fetching a fetch-packet that includes a set of instructions of a first hyper-block starting from a first address of a memory and ending at a predicted exit point of the first hyper-block based on a first bitwise distance from the first address of the first hyper-block to the predicted exit point;
executing a first branch instruction of the first hyper-block, wherein the first branch instruction corresponds to a first exit point, and wherein the first branch instruction has a target address corresponding to an entry point of a second hyper-block;
storing, responsive to executing the first branch instruction, a second bitwise distance from the first address of the first hyper-block to the first exit point; and
changing a value of a program counter from the first exit point of the first hyper-block to the entry point of the second hyper-block.

9. The method of claim 8, further comprising determining that the first exit point corresponds to the predicted exit point, and based on the determination, storing the first exit point in an exit history table.

10. The method of claim 9, further comprising identifying an address corresponding to the entry point of the second hyper-block as the target address of the first branch instruction.

11. The method of claim 10, further comprising:
performing an exclusive-or operation between each bit of the address corresponding to the entry point of the second hyper-block and each bit in a word in an exit history register; and
indexing the exit history table with at least some portion of a result of the exclusive-or operation.

12. The method of claim 11, further comprising retrieving an indexed value from the exit history table, the retrieved indexed value corresponding to a predicted exit point of the second hyper-block.

13. The method of claim 11, further comprising reconfiguring the exit history register to store one or more additional exits.

14. The method of claim 11, further comprising determining that the first exit point does not correspond to the predicted exit point, and based on determining that the first exit point does not correspond to the predicted exit point, flushing one or more values in the exit history register.

15. A non-transitory computer-readable medium storing machine instructions executable by a processor, the machine instructions comprising instructions to:
- fetch a fetch-packet that includes a set of instructions of a first hyper-block starting from a first address of a memory and ending at a predicted exit point based on a first bitwise distance from the first address of the first hyper-block to the predicted exit point;
- execute a first branch instruction of the first hyper-block, wherein the first branch instruction corresponds to a first exit point, and wherein the first branch instruction has a target address corresponding to an entry point of a second hyper-block;
- store, responsive to executing the first branch instruction, a second bitwise distance from the first address of the first hyper-block to the first exit point; and
- change a value of a program counter from the first exit point of the first hyper-block to the entry point of the second hyper-block.

16. The non-transitory computer-readable medium of claim 15, the machine instructions further comprising instructions to determine that the first exit point corresponds to the predicted exit point, and based on the determination, storing the first exit point in an exit history table.

17. The non-transitory computer-readable medium of claim 16, the machine instructions further comprising instructions to identify an address corresponding to the entry point of the second hyper-block as the target address of the first branch instruction.

18. The non-transitory computer-readable medium of claim 17, the machine instructions further comprising instructions to:
- perform an exclusive-or operation between each bit of the address corresponding to the entry point of the second hyper-block and each bit in a word in an exit history register; and
- index the exit history table with at least some portion of a result of the exclusive-or operation.

19. The non-transitory computer-readable medium of claim 18, the machine instructions further comprising instructions to: retrieve an indexed value from the exit history table, the retrieved indexed value corresponding to a predicted exit point of the second hyper-block.

20. The non-transitory computer-readable medium of claim 18, the machine instructions further comprising instructions to determine that the first exit point does not correspond to the predicted exit point, and based on the determination that the first exit point does not correspond to the predicted exit point, flush one or more values in the exit history register.

* * * * *